(12) United States Patent
Mill

(10) Patent No.: US 8,911,188 B1
(45) Date of Patent: Dec. 16, 2014

(54) DOUBLE FOLDING SEAT FOR A VEHICLE

(71) Applicant: Franz Kiel GmbH, Nördlingen (DE)

(72) Inventor: Juergen Mill, Ellwangen (DE)

(*) Notice: Subject to any disclaimer, the term of this patent is extended or adjusted under 35 U.S.C. 154(b) by 0 days.

(21) Appl. No.: 13/902,430

(22) Filed: May 24, 2013

(51) Int. Cl.
  *B60P 7/08* (2006.01)
  *B60N 2/02* (2006.01)

(52) U.S. Cl.
  CPC .................................... *B60N 2/02* (2013.01)
  USPC ................... 410/23; 410/7; 410/12; 410/100

(58) Field of Classification Search
  CPC ............ B60P 3/06; B60P 7/08; B60P 7/0823; B60P 7/0807; A61G 3/0808; A61G 5/10
  USPC .......... 410/7, 8, 9, 10, 11, 12, 19, 21, 22, 23, 410/100; 297/DIG. 4; 296/65.04; 280/304.1; 248/503.1
  See application file for complete search history.

(56) References Cited

U.S. PATENT DOCUMENTS

| | | | |
|---|---|---|---|
| 5,888,038 A | 3/1999 | Ditch et al. | |
| 6,698,983 B1 | 3/2004 | Kiernan et al. | |
| 7,040,847 B1 * | 5/2006 | Cardona | 410/7 |
| 7,455,490 B1 | 11/2008 | Goosen | |
| 7,717,655 B2 * | 5/2010 | Cardona | 410/7 |
| 7,963,730 B2 | 6/2011 | Ditch et al. | |
| 8,414,234 B2 * | 4/2013 | Girardin et al. | 410/7 |
| 2004/0005203 A1 | 1/2004 | Craft | |
| 2008/0315548 A1 | 12/2008 | Ditch | |
| 2009/0087278 A1 | 4/2009 | Girardin et al. | |
| 2010/0092263 A1 | 4/2010 | Girardin et al. | |

FOREIGN PATENT DOCUMENTS

CA  2208465  5/2005

* cited by examiner

*Primary Examiner* — Stephen Gordon
(74) *Attorney, Agent, or Firm* — Jon Fallon, Esq.; Michael Kochka, Esq.

(57) ABSTRACT

The invention relates to a double folding seat for a vehicle, particularly a public transportation vehicle such as a bus or a train, with a bench seat positioned in the direction of travel of the vehicle that has a backrest and a seating surface that can be folded between a home position and a sitting position, with a retaining device for holding a wheelchair or the like that has at least two hooks arranged in extension of the backrest and mounted on a wall supported on a floor of the vehicle, which hooks can be tightened by respective tightening members and loosened by respective loosening members, with a safety belt for the wheelchair user and with a covering for the tightening members and loosening members.

11 Claims, 3 Drawing Sheets

DOUBLE FOLDING SEAT FOR A VEHICLE

BACKGROUND OF THE INVENTION

The invention relates to a double folding seat for a vehicle, particularly a means of public transportation such as a bus or a train.

A wide variety of devices are known from the general prior art for securing wheelchairs within means of public transportation, particularly in busses. The drawback of such devices is that they are difficult to handle, require a relatively large amount of space and, particularly, the fact that the seats associated with these devices usually cannot be used by people when the device is not accommodating a wheelchair.

It is therefore the object of the present invention to provide a double folding seat for a vehicle, particularly a means of public transportation such as a bus or a train, which is easy to handle and particularly only requires a very small amount of space when not in use.

SUMMARY OF THE INVENTION

This object is achieved according to the invention by a double folding seat for a vehicle, particularly a means of public transportation such as a bus or a train, with a bench seat positioned in the direction of travel of the means of transportation having a backrest and a foldable seating surface that can be folded between a home position and a sitting position, with a retaining device for holding a wheelchair or the like which has at least two hooks mounted on a wall arranged in extension of the backrest and supported on the floor of the vehicle, said hooks being tightened by means of respective tightening means and loosened by means of respective loosening means, with a safety belt for the wheelchair user and with a covering for the tightening means and the loosening means.

Using the tightening means and loosening means, the hooks holding the wheelchair can very easily be locked in order to secure the wheelchair to the wall on which the hooks are mounted. Together with the covering for the tightening means and loosening means, this results in a fully integrated anchoring system for a wheelchair in a vehicle. Since the bench seat has a foldable seating surface, it can, when no wheelchair is fixed to the wall, be brought into the horizontal position in order to provide seating for two people. However, if a wheelchair is to be fixed to the wall, then the seating surface can be brought into the vertical position in order to provide space for the wheelchair. An advantage of the wall attached to the floor is that, in principle, the double folding seat can be mounted anywhere in the vehicle, independently of whether there is a window in the area or not. The safety belt is embodied as a three-point safety belt for the wheelchair user and therefore offers them sufficient safety in the event of a collision.

The covering for the tightening means and loosening means prevents soiling of the tightening means and loosening means and also serves to protect the passengers from possible injury from the tightening means and loosening means. Simple operation of the tightening means can be achieved by providing the tightening means with a ratchet. Moreover, the hooks mounted on the wall can be mounted on and removed from the wall by means of respective tethers. In this case, the ratchet can engage on the respective tether in order to thus fix the tether and hence the hooks in their position. Independent tightening of the hooks is achieved if the tightening means have a spring pulling the hook toward the wall.

The tightening means can have an arresting mechanism blocking the hook. Such an arresting mechanism can be used to fix the hook in a certain position so that the hook can no longer be moved, thus resulting in secure fixation of the wheelchair to the wall. To connect the wheelchair to the vehicle even more securely, two additional hooks can be provided on a side opposite the wall. This reliably prevents the wheelchair from tipping over, in particular, since the front area of the wheelchair is additionally braced.

These hooks can be provided with respective retractors so that the hooks do not constitute a nuisance when not being used. If a column for accommodating the safety belt for the wheelchair user is arranged on wall supported on the floor of the vehicle, then the person in the wheelchair can also even be additionally secured using a belt arranged on this column. Additional security can be achieved by providing a lap belt in a lower area of the wall supported on the floor.

Furthermore, the double folding seat can have an additional bench seat that can be mounted on a wall running perpendicular to the wall supported on the floor. Such a bench seat, which basically runs along the side wall of the vehicle, offers two additional people seating, which further increases the transport capacity of the vehicle equipped with the double folding seat. Particularly, four seating places are made available as a result when no wheelchair is located in this area. The at least one additional bench seat can be foldable. In that case, when it is in its vertical position, the bench seat can usually be used by two people; when in its upright position, by contrast, it is in a home position in which it does not disturb the positioning of the wheelchair.

The double folding seat is therefore a double folding seat with fully integrated, well covered retaining devices for fixing and bracing a wheelchair but also for securing the wheelchair user. A sample embodiment of the invention is described below with reference to the drawing.

DESCRIPTION OF THE SAMPLE EMBODIMENT

Figure 1:
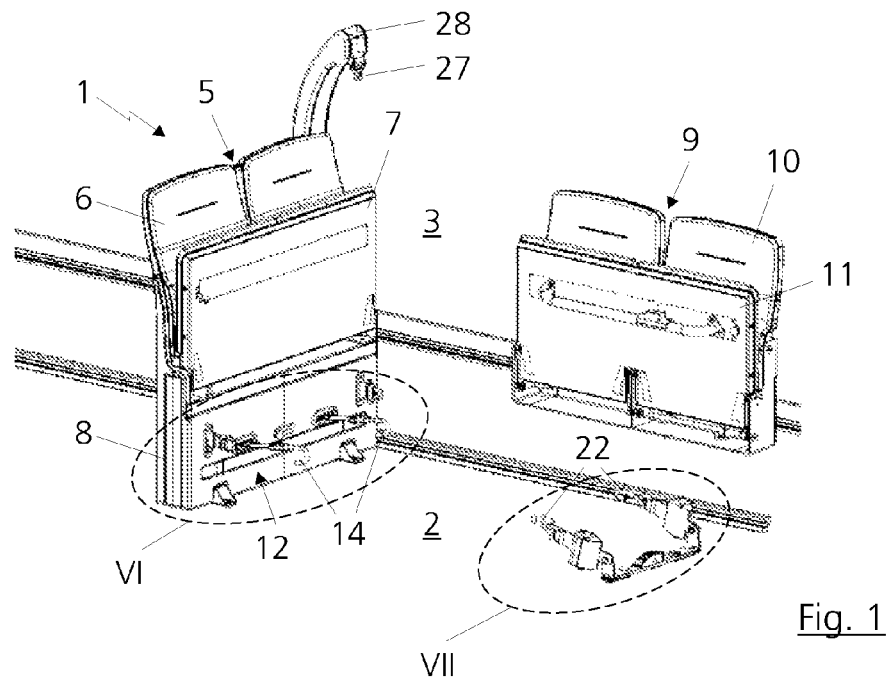
FIG. 1 shows a perspective view of the double folding seat according to the invention.
Figure 2:
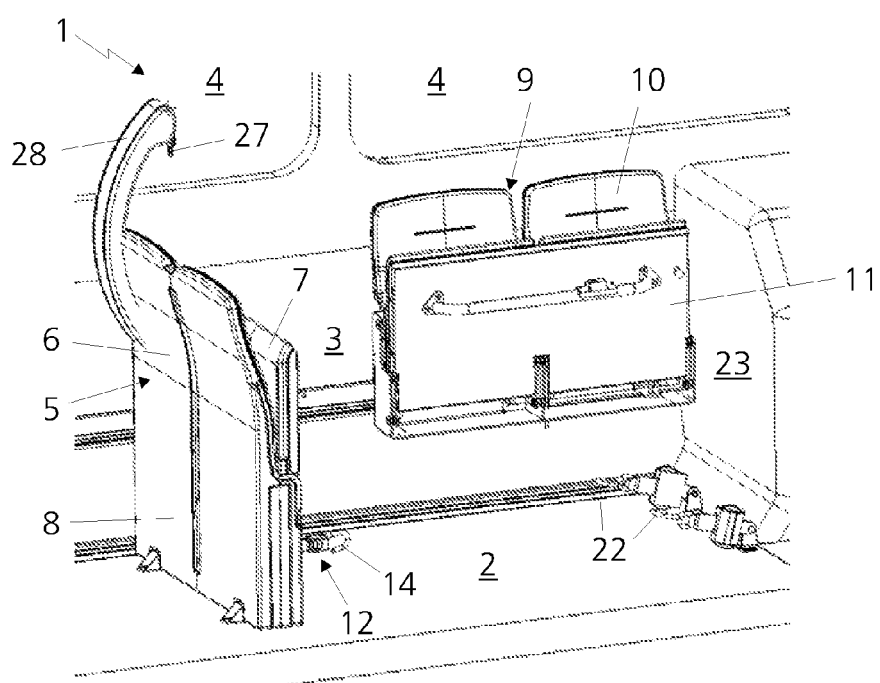
FIG. 2 shows another perspective view of the double folding seat from FIG. 1.

FIGS. 1 and 2 show a double folding seat 1 for a vehicle not shown in its entirety, particularly a means of public transportation such as a train or a bus. FIGS. 1 and 2 show a floor 2 and a side wall 3, and FIG. 2 also shows two windows 4.

Figure 5:
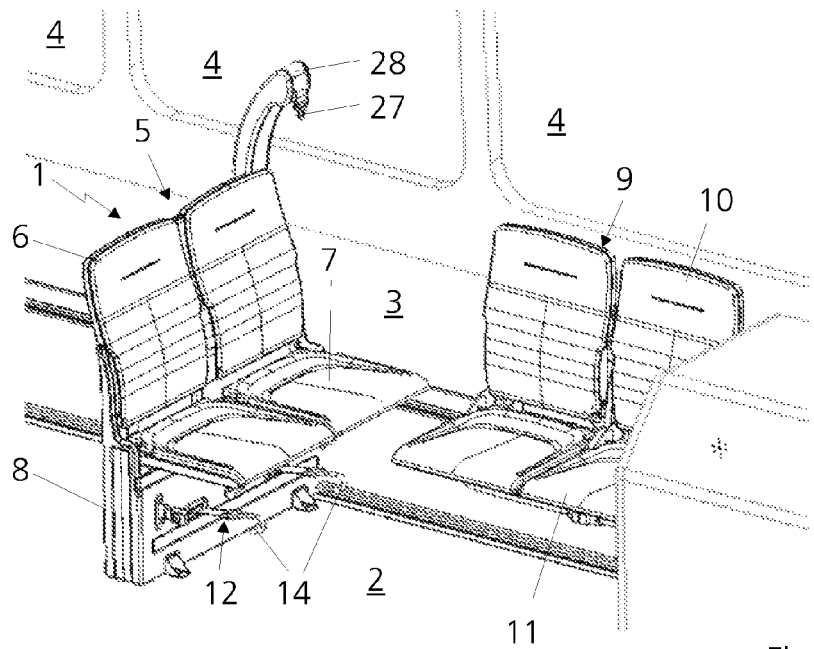
FIG. 5 shows the double folding seat from FIG. 1 in a position to be used by non-handicapped passengers.

The double folding seat 1 has a bench seat 5 facing in the direction of travel of the means of transportation which has a backrest 6 and a seating surface 7 that can be moved by folding between a home position shown in FIGS. 1 and 2 and a sitting position shown in FIG. 5. In the present case, the bench seat 5 is designed for two people, i.e., the backrest 6 and the seating surface 7 each have two sections each of which is designed for one person. In the present case, the two sections of the seating surface 7 are folded together between the home position and the sitting position, although it would also be possible in principle for the two sections of the seating surface 7 to be folded over independently of each other. The backrest 6 and the seating surface 7 are mounted on a wall 8 which runs substantially perpendicular to the side wall 3 of the vehicle and arranged in extension of the backrest 6 and is supported on the floor 2 of the vehicle. In addition, the wall 8 can also be attached to the side wall 3 of the vehicle. To attach the wall 8 to the floor 2 and, optionally, to the side wall 3 of the vehicle, attachment means can be used that are inherently known.

Beside the bench seat 5, the double folding seat 1 has another bench seat 9 which is mounted on the side wall 3 of the vehicle. The additional side bench 9 is therefore oriented substantially perpendicular to the previously described bench seat 5. As a result, the passengers on the bench seat 9 do not sit, like the passengers on the bench seat 5, in the direction of travel of the vehicle, but rather perpendicular to the direction of travel. Similarly to the bench seat 5, the bench seat 9 also has a backrest 10 and a seating surface 11 that can be folded between a home position and a sitting position which, as can be seen in FIG. 5, provides space for two people.

Figure 3:
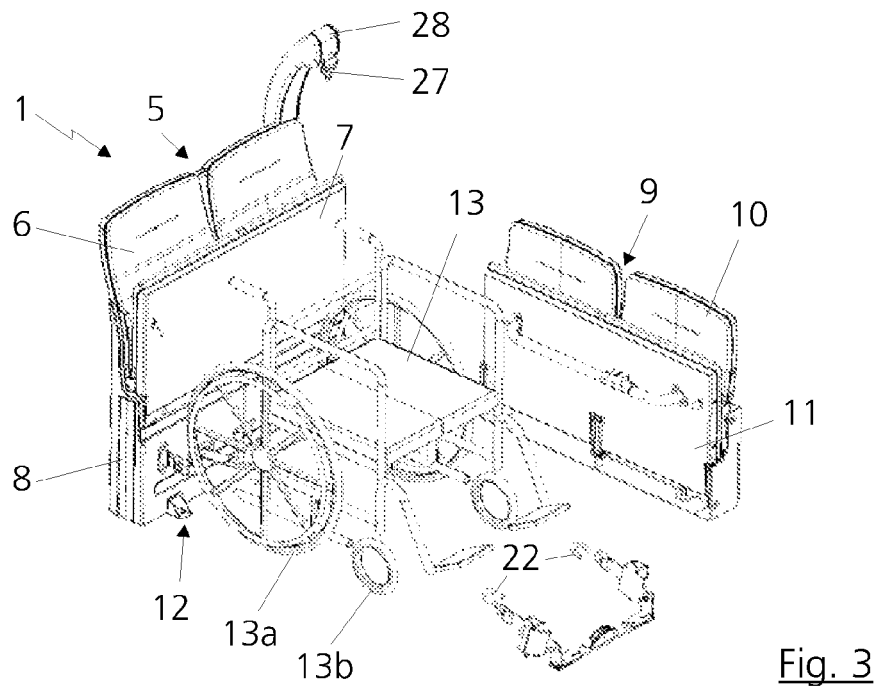
FIG. 3 shows the double folding seat from FIG. 1 with a wheelchair arranged therein.
Figure 4:
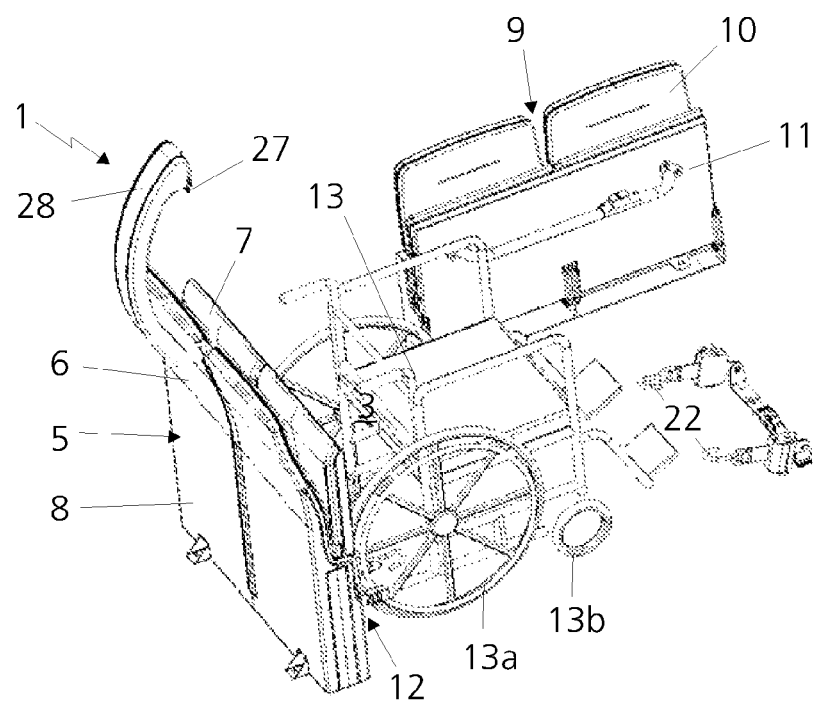
FIG. 4 shows the double folding seat from FIG. 2 with a wheelchair arranged therein.

The double folding seat 1 also has a retaining device 12 that serves to hold a wheelchair as shown in FIGS. 3 and 4. The retaining device 12 shown in enlarged representation in FIG. 6 has two hooks mounted on the wall 8 which, as shown in FIGS. 3 and 4, serve to engage with the rear wheels 13a of the wheelchair 13. In general, the hooks 14 can be tightened by means of respective tightening means 15 and loosened by means of respective loosening means 16.

Figure 6:
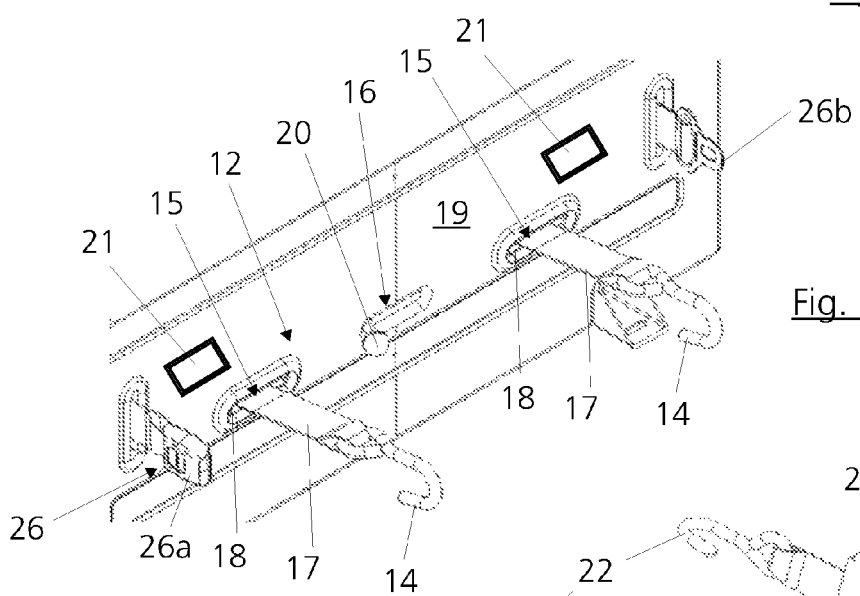
FIG. 6 shows an enlarged representation along line VI from FIG. 1.

The two tightening means 15 for the hooks 14 can have a ratchet, for example, which is not shown. This ratchet can engage on a respective tether 17 with which each of the hooks 14 can be mounted on the wall 8 and pulled out of the wall 8. The tethers 17 run through respective slots 18 in the wall 8. The wall 8 has a covering 19 in this area that is embodied as a full covering which serves to cover the tightening means 15 and the loosening means 16 so that they are not directly accessible from the outside. As part of the loosening means 16, FIG. 6 shows a release lever 20 which serves to loosen the tightening means 15, which is to say the ratchet in this sample embodiment.

Alternatively to the ratchet, the tightening means 15 can also have a spring (not shown) that pulls the hook 14 toward the wall 8 so that, when the hook 14 is hooked into the rear wheel 13a of the wheelchair 13, the wheelchair 13 is pulled toward the wall. To prevent the wheelchair 13 from moving away from the wall 8, the tightening means 15 preferably also have an arresting mechanism blocking the hook 14 that is also not shown in the figures and that prevents the hook 14 from being pulled further out, thus having the effect of blocking the rear wheel 13a of the wheelchair 13. The arresting mechanism can be embodied in the manner of a self-blocking detent mechanism and be actuated by an actuating element 21, also shown in FIG. 6, in order to block the hook 14. The release lever 20 and/or the actuating element 21 can act on the hooks 14 by means of respective Bowden cables.

Figure 7:
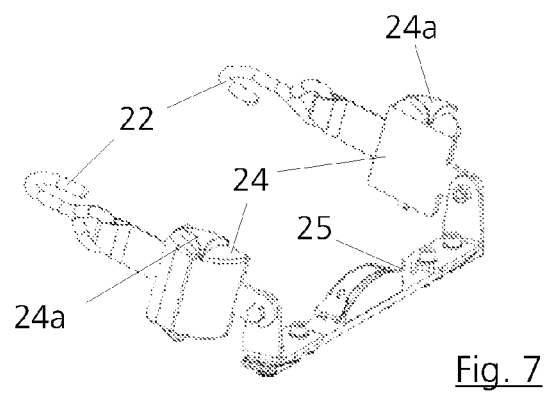
FIG. 7 shows an enlarged representation along line VII from FIG. 1.

In the present case, the retaining device 12 has two other hooks 22 which are arranged on a side opposite the wall 8 and are attached in the present case to the floor 2. Optionally, both of the hooks 22 could also be mounted on a wall 23 opposite the wall 8. In the enlarged illustration of FIG. 7, one can see that the hooks 22 are attached to the floor 2 in the present case via retractors 24 and a retaining element 25. The retractors 24 can assume a similar function here as the tightening means and the loosening means of the hooks 14 and are provided with a star knob 24a for this purpose. The hooks 22 are provided for engaging with the front wheels 13b of the wheelchair 13, so that the wheelchair 13 is attached to the vehicle at a total of four points.

The method for fixing the wheelchair 13 to the vehicle therefore provides the engagement of the hooks 14 with the rear wheels 13a of the wheelchair 13, upon which the tightening means 15 ensure that the hooks 14 can no longer release from the wheels 13a of the wheelchair 13. The rear wheels 13a are braced against the wall 8, and the hooks 14 are preferably located below the middle of the rear wheels 13a in order to prevent the wheelchair 13 from tipping backwards. Then the two front hooks 22 are made to engage with the front wheels 13b of the wheelchair 13 and fixed in a similar manner as the hooks 14. For example, the retractors 24 can be used for this. Depending on the type and degree of handicap of the person in the wheelchair 13, either the person themself or another person in the vehicle can perform these procedures. Optionally, several of the options described above can also be present in order to enable people with different handicaps to operate the retaining device 12 as easily as possible.

In addition, the person (not shown in the figures) sitting in the wheelchair 13 can strap themselves in by means of a lap belt 26. In the present case, the lap belt 26 is provided in a lower area of the wall 8 and has a buckle 26a that is used to accommodate a belt tongue 26b. The lap belt 26 with the buckle 26a and the belt tongue 26b is also illustrated on an enlarged scale in FIG. 6. Moreover, the person in the wheelchair 13 can strap themselves in using another safety belt 27 embodied as a three-point belt which is held by a column 28 or arranged on the column 28 which, in turn, is attached to the wall 8. The belt tongue of the safety belt 27 can be inserted into the buckle 26a of the lap belt 26 in a manner not shown.

The invention claimed is:

1. A double folding seat for a vehicle comprising:
    a bench seat positioned in a direction of travel of the vehicle the bench seat comprising a backrest and a seating surface constructed to be folded between a home position and a sitting position;
    a retaining device for holding a wheelchair, the retaining device comprising at least two hooks mounted on a wall extending from the backrest and supported on a floor of the vehicle, wherein the at least two hooks can be tightened by respective tightening means and loosened by respective loosening means;
    a shoulder safety belt for a user of the wheelchair;
    a covering for the tightening means and the loosening means; and
    at least one additional bench seat which is mounted on a second wall running perpendicular to the wall extending from the backrest;
    wherein a space for the wheelchair is positioned in front of the bench seat positioned in the direction of travel of the vehicle.

2. The double folding seat as set forth in claim 1, wherein the tightening means have a ratchet.

3. The double folding seat as set forth in claim 2, wherein the hooks mounted on the wall are mounted on the wall with respective tethers and can be pulled out of the wall, and wherein the ratchet engages on the respective tethers.

4. The double folding seat as set forth in claim 1, wherein the tightening means comprise a spring pulling the at least two hooks toward the wall.

5. The double folding seat as set forth in claim 4, wherein the tightening means comprise an arresting mechanism blocking the at least two hooks.

6. The double folding seat as set forth in claim 1, wherein two additional hooks are provided on a side opposite the wall.

7. The double folding seat as set forth in claim 6, wherein the additional hooks are provided with retractors.

8. The double folding seat as set forth in claim 1, wherein a column for accommodating the shoulder safety belt for the wheelchair is arranged on the wall supported on the floor of the vehicle.

9. The double folding seat as set forth in claim 1, wherein a lap belt is provided in a lower area of the wall supported on the floor.

10. The double folding seat as set forth in claim 1, wherein the at least one additional bench seat is foldable.

11. The double folding seat of claim 1, wherein the vehicle comprises a bus or a train.

* * * * *